United States Patent [19]

Pierce et al.

[11] Patent Number: 5,353,688
[45] Date of Patent: Oct. 11, 1994

[54] TAMPER-RESISTANT BRAKE ACTUATOR

[75] Inventors: William C. Pierce; William J. Hicks, both of Muskegon, Mich.

[73] Assignee: Nai Anchorlok, Inc., Muskegon, Mich.

[21] Appl. No.: 905,004

[22] Filed: Jun. 26, 1992

[51] Int. Cl.⁵ .............................. F16D 65/24
[52] U.S. Cl. ............................ 92/63; 92/48; 92/98 R; 188/170
[58] Field of Search ........... 188/170, 166, 167, 153 D, 188/151 R, 152; 277/167.5; 92/63, 48, 98 R; 403/315, 316, 317, 365

[56] References Cited

U.S. PATENT DOCUMENTS

| | | | |
|---|---|---|---|
| 3,107,583 | 10/1963 | Woodward | 92/63 |
| 3,334,545 | 8/1967 | Houser | 91/49 |
| 3,424,062 | 1/1969 | Gummer et al. | 92/63 |
| 4,706,367 | 11/1987 | Garringer | 403/365 X |
| 4,960,036 | 10/1990 | Gummer et al. | 92/63 |

FOREIGN PATENT DOCUMENTS

| | | |
|---|---|---|
| 0313217 | 4/1989 | European Pat. Off. . |
| 2411438 | 9/1975 | Fed. Rep. of Germany ...... 188/170 |
| 2000225 | 1/1979 | United Kingdom . |

*Primary Examiner*—Robert J. Oberleitner
*Assistant Examiner*—Lee Young
*Attorney, Agent, or Firm*—Varnum, Riddering, Schmidt & Howlett

[57] ABSTRACT

An air-operated combination diaphragm spring brake has a tamper-resistant seal provided between a head (46) and a spring side of a flange case (18) which together form a spring chamber (16) housing a power spring (72). The head (46) has an annular rim (70), and the flange case has an annular flange (74) with a diaphragm (48) sandwiched therebetween. An annular lip (76) on annular rim (70) extends over the annular flange (74). A snap ring (82) is engaged by opposing annular grooves (80), (78) on the outside of the annular flange (74) and inside of the annular lip (76), respectively, to form the tamper-resistant seal.

20 Claims, 6 Drawing Sheets

TAMPER-RESISTANT BRAKE ACTUATOR

BACKGROUND OF THE INVENTION

1. Field of the Invention

This invention relates to an improvement in air-operated combination diaphragm spring brake actuators of the type used with air brake systems on vehicles such as trucks. In one of its aspects, the invention relates to a spring brake actuator having a tamper-resistant spring chamber.

2. State of the Prior Art

Spring-applying brake actuators are in common use with air brake systems used on trucks, buses, and towed vehicles. Such actuators are normally provided with a service chamber for normally applying and releasing the brakes in response to delivery and exhaust of compressed air, and a spring chamber disposed in tandem with the service chamber for providing parking or emergency brake functions. A spring brake actuator uses spring force to operate a service brake actuator and apply brakes when pressurized air in the spring chamber is reduced below some predetermined level. Air pressure may be reduced in the spring chamber to apply the brakes under the control of the operator or automatically as a result of failure of the air system. The service chamber and spring chamber are separated by an adapter or flange casing which forms a wall between the two chambers.

In a typical spring brake, a barrel-shaped power spring is used to store energy and to exert the large force required for braking in the event of air pressure failure. Air pressure acting on a diaphragm or a piston is employed to compress the spring and maintain it in its brake release position. When the air is exhausted, the spring acts on a pressure plate which in turn acts against the diaphragm, typically an elastomeric diaphragm or a piston, and through an actuating rod exerts the spring force on the service push rod to apply the brakes in the event of a failure of the system air pressure.

The spring brake actuator operates within the spring chamber, which is typically formed by clamping an elastomeric diaphragm between a head (sometimes also known as a spring housing or spring chamber) and the adapter. The power spring is typically compressed within the spring chamber between the head and the diaphragm. The spring has a high spring constant and typically weighs 3 pounds or more being compressed to a linear length of less than 3 inches from an original uncompressed length in an extended condition of from 9 to 12 inches. With a high spring constant, the spring has a substantial amount of potential energy, exerting a force on the head of from 2,000 to 3,000 pounds.

Various approaches have been heretofore proposed for sealing the brake actuator head to the adapter. Typically, a clamp band is used to clamp mating flanges on the head and adapter to seal the spring chamber. To prevent disassembly of the two parts, the clamp band may be formed from a continuous ring, and deformed over the flanges. Alternatively, one flange may be deformed over the opposing flange.

Several designs have employed a ring having an interference fit with both the adapter and head to hold the two together. For instance, U.S. Pat. No. 3,107,583 employs a split snap ring in a piston-operated brake actuator which fits into a groove on the inward face of the adapter to hold the head in place against the force of the power spring. The snap ring is exposed to the elements and may be removed to disassemble the head from the adapter. In European Patent Application Pub. No. 313 217 A1, the snap ring is replaced by a locating ring comprising a hard core such as a coil spring encased by a watertight elastomeric coating. The locating ring has an interference fit between an annular groove on the inward face of the adapter and a lip on the head. The locating ring may be removed by moving the head inwardly of the adapter so that a smaller diameter portion of the head is opposite the annular groove. The locating ring may then be compressed out of the groove and removed. Neither design provides an effective tamper-resistant closure which significantly inhibits manual removal of the head.

SUMMARY OF THE INVENTION

The invention is directed to an improved clamping mechanism for securing a head to an adapter in a fluid-operated brake actuator to effectively inhibit the detachment of the head from the adapter, thus providing a tamper-resistant brake actuator.

The clamping means is intended for use in a fluid-operated brake actuator of the type having a generally cylindrical head with a first annular flange. The first annular flange has a radially outwardly protruding shoulder and an annular rim extending axially from the shoulder. The rim has an inward face and a terminal annular edge. The actuator further has a flange case with a second annular flange, having an axially disposed outward face in confronting relationship to the inward face. The head and flange case thereby define a chamber. A power spring is compressed within the chamber, and the force of the power spring tends to separate the head from the flange case.

The clamp comprises a first annular groove in the inward face, disposed axially from the terminal annular edge, and an opposing second annular groove in the outward face. A portion of the outward face is in confronting relationship to the inward face between the first annular groove and the terminal annular edge. A ring, having a radial outward portion disposed in the first annular groove and a radial inward portion disposed in the second annular groove, securely fixes the head to the flange case. The ring is substantially inaccessible from the exterior of the brake actuator thereby deterring manual separation of the head from the flange case.

The brake actuator second annular flange may have a generally radially disposed face and a flexible diaphragm having a circumferential edge portion compressed between the radially outwardly protruding shoulder and the radially disposed face.

The radially disposed face may have an annular dished portion, and the diaphragm may have an annular bead, with the bead received in the dished portion.

The depth of the second annular groove may be at least equal to the width of the ring. The ring may be split and extends circumferentially less than 360°.

The power spring may be disposed between the diaphragm and the head.

The ring may be flat to define a generally rectangular cross section.

BRIEF DESCRIPTION OF THE DRAWINGS

The invention will now be described with reference to the accompanying drawings in which.

DETAILED DESCRIPTION OF THE DRAWINGS

Figure 1:
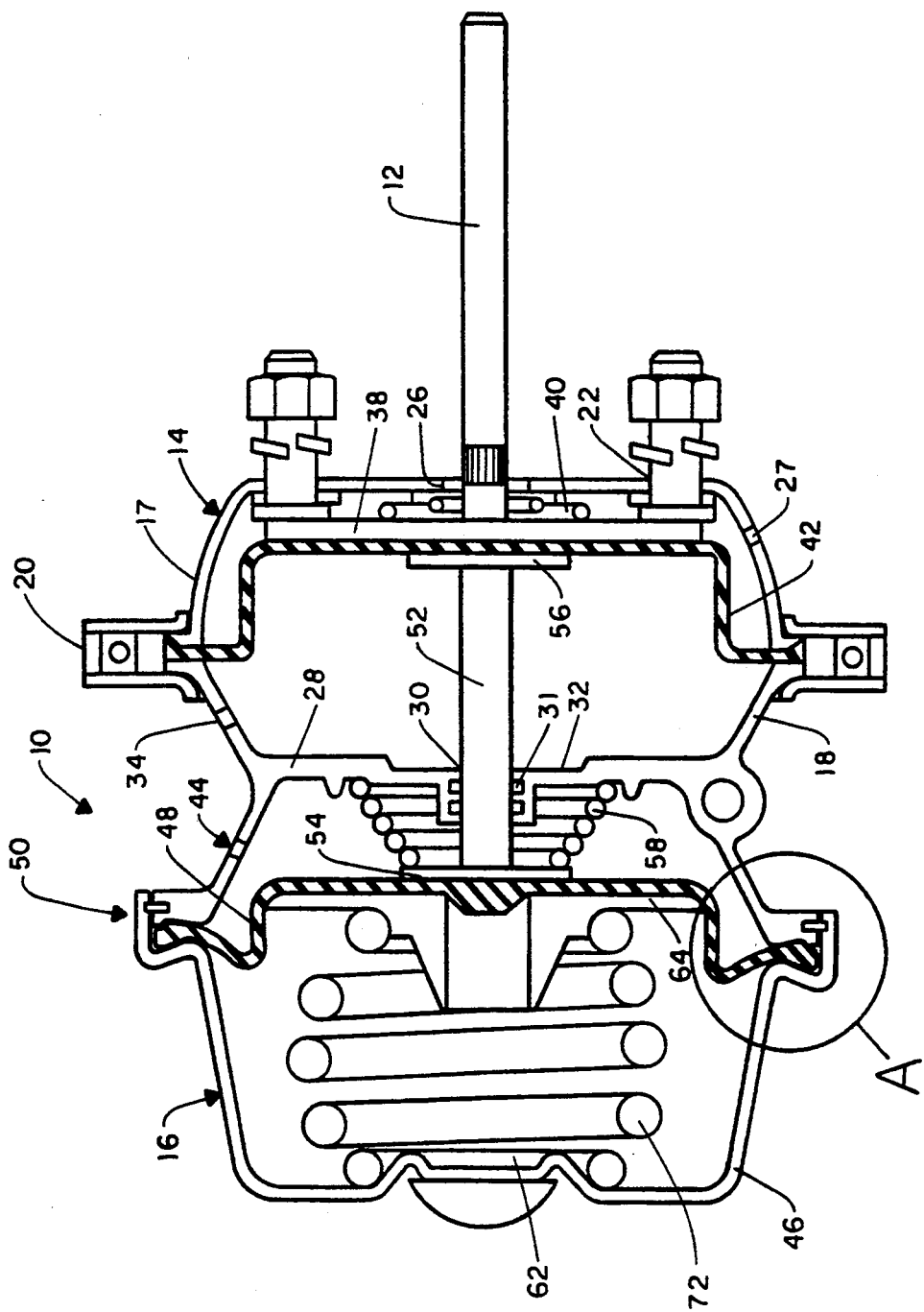
FIG. 1 shows a cross-sectional view of an air-operated combination diaphragm spring brake actuator.

Referring now to FIG. 1, there is shown a fluid-operated brake actuator 10 illustrating the environment in which the invention typically appears. The particular embodiment shown is an air-operated combination diaphragm spring brake actuator. The brake actuator is adapted to mount to a frame (not shown) of a vehicle and is further adapted to operate a brake (not shown) through a service push rod 12 which typically extends to and connects with a slack adjuster and the braking system of the vehicle.

The air-operated combination diaphragm spring brake comprises a service chamber 14 and a spring chamber 16 joined together in tandem. The service chamber 14 is defined by a cup-shaped service housing 17 and a double cup-shaped adapter 18 joined together through a clamp 20 to form a hollow interior chamber. The adapter 18 is sometimes also known as a flange case. A first elastomeric diaphragm 42 (also known as the service brake diaphragm) is clamped in fluid tight engagement between the service housing 17 and the service side of the adapter 18. Openings 22 are provided in the service housing 17 for bolts 24 which typically bolt the service housing 17 to a bracket on an axle near the vehicle wheels (not shown). A central opening 26 and one or more vent openings 27 are also provided in the service housing 17.

The adapter 18 forms a divider wall 28 and has a central opening 30 with one or more seals 31 positioned therein. An indentation or annular depression 32 is formed around the opening 30. An aperture 34 is provided in the adapter 18 for providing communication between a source of pressure (not shown) and the portion the service chamber 14 between the diaphragm 42 and the adapter 18 to permit the air to act upon the diaphragm in a manner to be described.

The service push rod 12 is mounted within the service chamber 14 for reciprocation within the central opening 26 and mounts a service push rod plate 38 at an inner end thereof. A service return spring 40 extends between a central portion of the service housing 17 and the service push rod plate 38 to bias the service push rod plate 38 and thus the service push rod 12 inwardly of the service chamber 14 to release the brake. The spring biased service push rod plate 38 normally forces the diaphragm 42 against the divider wall 28 on the service side of adapter housing 18 in the brake release position.

When air pressure is supplied through the aperture 34 as, for example, when the brakes are applied by a vehicle operator, air pressure is introduced between the diaphragm 42 and the divider wall 28, thereby forcing the diaphragm 42 toward the central portion of the service housing 17 (to the right as seen in FIG. 1). In this manner, the service push rod 12 is extended outwardly of the service chamber 14 as illustrated to apply braking pressure to the vehicle brakes in a conventional fashion.

The spring chamber 16 is defined by the spring side of the adapter 18 and a generally cylindrical head 46 or spring housing which is attached to the spring side of the adapter 18 through an attaching mechanism 50. It is the attaching mechanism 50 which forms the subject matter of the invention as will be hereinafter shown. A second elastomeric diaphragm 48 known as the spring diaphragm is clamped in fluid tight engagement between the spring side of adapter 18 and the head 46 by the attaching mechanism 50.

An aperture 44 is provided within the spring side of the adapter 18 to connect the spring chamber 16 with a source of pressure (not shown). An adapter push rod 52 is mounted within the adapter 18 to extend within the spring chamber 16 and has a reaction plate 54 rigidly mounted to one end, and a second reaction plate 56 mounted to the other end thereof. The adapter push rod 52 extends through the opening 30 and in sealing engagement with at least one seal 31. The reaction plate 56 seats within the annular depression 32 of the divider wall 28. An adapter return spring 58 is mounted within the spring chamber 16 between the divider wall 28 and the reaction plate 54 to bias the adapter push rod 52 into the release position.

A pressure plate 64 bears against the diaphragm 48. A power spring 72 is positioned between the pressure plate 64 and the head 46 to bias the pressure plate 64 and the push rods to a brake actuating position as viewed in FIG. 1. The adapter 18 is typically cast aluminum and the head 46 is typically stamped or spun low-carbon steel.

A release tool (not shown) can be provided within a central opening 62 of the head 46 for mechanically drawing the pressure plate 64 into a retracted or "caged" position in the event there is a need to mechanically release the brake. The release tool typically comprises a threaded rod having a nut threaded on the end thereof and a washer which bears against the outer surface of the head 46. Projections on the end of the threaded rod are selectively engageable with portions of the pressure plate 64 in a manner well known in the spring brake field.

In operation, air pressure is continually supplied to the spring chamber 16 through the aperture 44 to maintain the spring diaphragm 48 in a position to compress the power spring 72. In this position, the service push rod 12 normally will be operated as described above by selective pressurization of air into the service chamber 14 through the aperture 34. However, in the event of failure of the air pressure system, the pressure in the spring chamber 16 will be decreased so that the service return spring 40 and adapter return spring 58 would no longer be able to overcome the pressure of the much larger and stronger power spring 72. Thus, the pressure plate 64 forces the spring diaphragm 48, and thus the adapter push rod 52 outwardly, thereby also forcing the service push rod 12 outwardly to apply braking pressure to the brakes.

Figure 2:
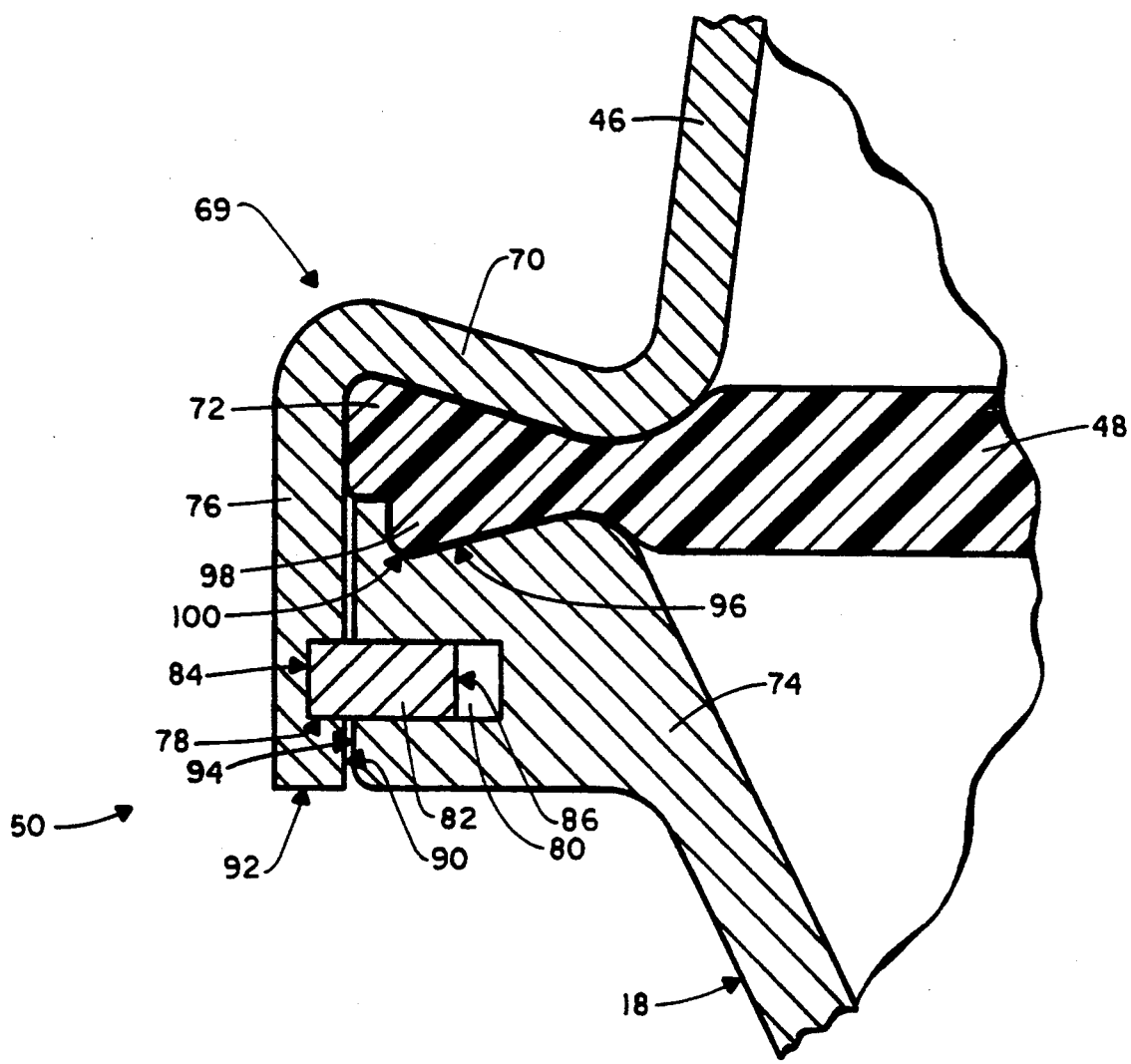
FIG. 2 is an enlarged sectional view of the portion of the actuator enclosed by circle A in FIG. 1, and showing the tamper-resistant clamp according to the invention.

The attaching mechanism 50 which secures the head 46 to the adapter 18 is seen in cross section in FIG. 2. It can be seen that the head 46 has an annular flange 69 comprising a radially outwardly protruding shoulder 70 and an annular rim 76 extending axially from the shoulder 70. The annular rim 76 has an annular inward face 90. The adapter 18 has an annular flange 74 having a radially disposed face 96, and an annular outward face 94 in confronting relationship to the inward face 90 of the annular rim 76. A circumferential peripheral edge 72 of the spring diaphragm 48 is disposed between the shoulder 70 on the head 46 and the face 96 on the adapter 18. Preferably, the shoulder 70 and the face 96 are angled as shown in FIG. 2 so that shoulder 70 and face 96 diverge as they extend outwardly radially, to retain an annular thickening or bead 98 at the peripheral edge 72 of the spring diaphragm 48. The face 96 may be shaped to comprise an annular dished portion 100 to retain the bead 98.

The annular rim 76 extends over the second annular flange 74 on the adapter 18, and terminates at a terminal annular edge 92. The head annular flange 69 includes an annular groove 78 in its inward face 90, and the adapter annular flange 74 has an opposing annular groove 80 on its outward face 94. A snap ring 82, having an outer radial portion 84 positioned in the head annular groove 78, and an inner radial portion 86 positioned in the adapter annular groove 80, keeps the head 46 securely attached to the adapter 18. The clearance between the inward face 90 and the outward face 94 is preferably in the range of 0.010 inches to 0.015 inches.

Figure 3:
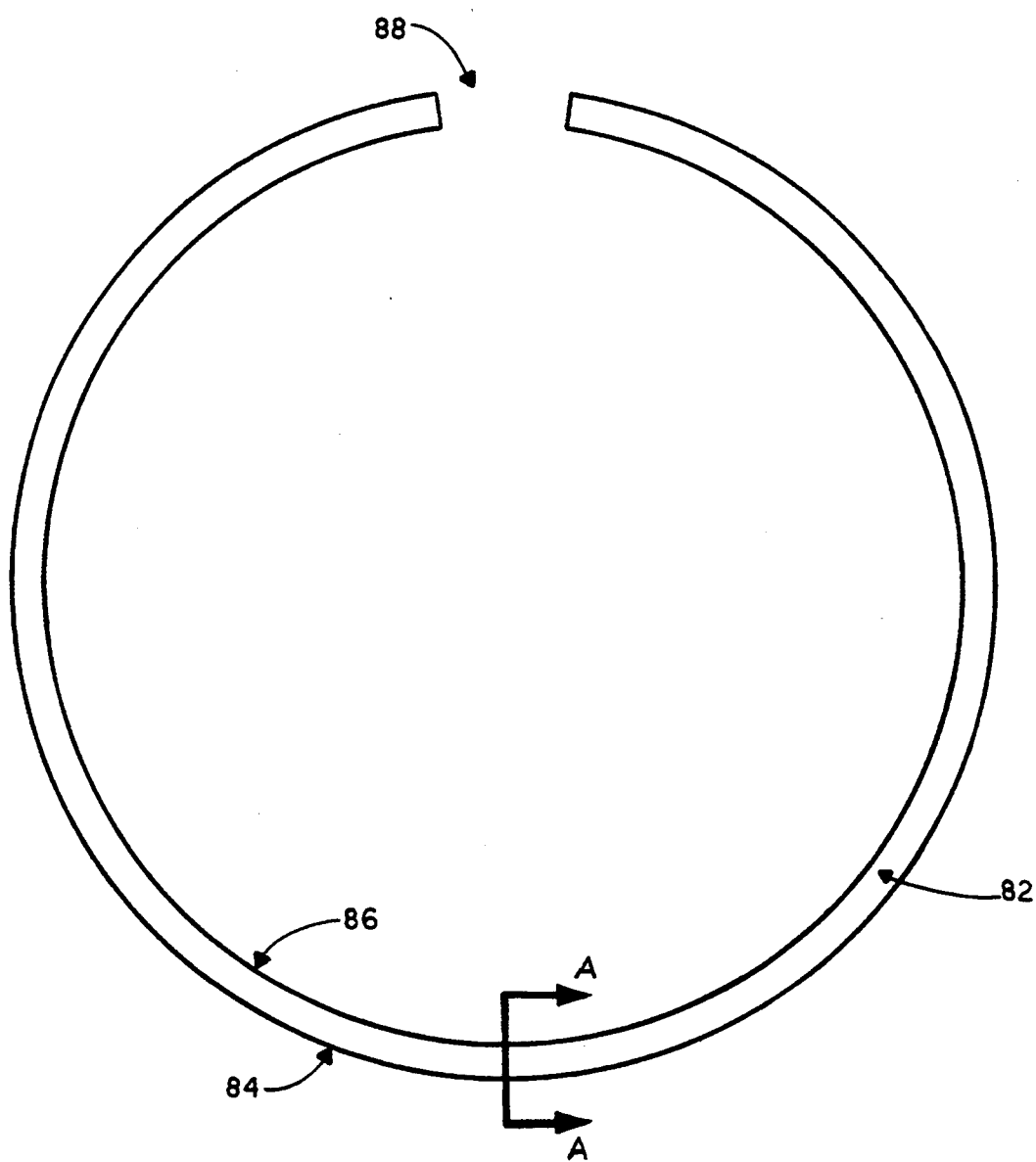
FIG. 3 is a plan view of the snap ring used in the formation of the spring chamber.
Figure 3A:
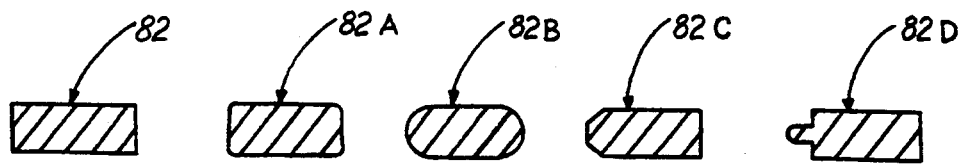
FIG. 3A is a cross-sectional view of several alternative embodiments of the snap ring of FIG. 3.

A preferred embodiment of the snap ring 82 is more clearly shown in FIG. 3. The snap ring 82 has less than 360° circumference, being interrupted by a small gap 88, so that the snap ring's effective diameter can be reduced for installation as will be described below. As shown in FIG. 3A, various cross-sectional shapes may be appropriate, such as circular, oval or rectangular, however a rectangular cross section forming a thin, flat ring is preferred. The ring is preferably formed from high yield strength type 302 stainless steel or carbon spring steel (SAE 1060-1095) with corrosion-resistive coating. Any other suitable spring material having corrosion-resistant coating or treatments may be used.

Returning to FIG. 2, the adapter 18 is preferably die cast of aluminum. The adapter groove 80 may be formed by casting, machining or rolling, but is preferably formed by casting. The head groove 78 may also be formed by either casting, machining or rolling.

The adapter groove 80 must be deep enough so that it can completely receive the snap ring 82 whereby the snap ring 82 does not protrude outside of the groove 80. In the snap ring's normal state, the radius of the outer radial portion 84 is larger than the radius of the adapter flange 74 at the groove 80, thus causing the outer radial portion 84 of the snap ring 82 to protrude from the groove 80. However, the snap ring 82 can be deformed by squeezing opposite sides the outer radial portion 84, thus narrowing the gap 88 and reducing the radius of the outer radial portion 84. The gap 88 is sized to allow the snap ring 82 to be radially deformed into the adapter groove 80 so that no part of the snap ring 82 protrudes from the groove 80.

The head 46 is permanently mated to the adapter 18 by the snap ring 82. To assemble the parts, a funnel (not shown) is placed with its throat end against the annular rim 76 on the head 46. The snap ring 82 is inserted into the groove 80 in the adapter flange 74. The adapter flange 74 is then inserted into the large end of the funnel. By moving the adapter 18 inwardly of the funnel, the snap ring 82 is squeezed into the adapter groove 80 as described above so that its outer radial portion 84 is completely received within the groove 80.

The adapter is then moved inwardly of the annular rim 76 on the head 46 until the head and adapter grooves 78, 80 are in registry and the snap ring 82 is released. When the snap ring 82 is released, it returns to its former shape, thus engaging the groove 78 on the annular rim 76. The snap ring 82 is then engaged in both the head and adapter grooves 78, 80, thus locking the head 46 to the adapter 18. Once installed, the snap ring 82 is essentially not accessible, because groove 78 is positioned axially from the terminal annular edge 92 while the portion of the inward face 90 between the groove 78 and the annular edge 92 remains in confronting relationship to the outward face 94. Thus, the head 46 can not be removed without deforming, or otherwise materially altering the head 46 or the adapter 18 or both. The invention thus provides an effective tamper-resistant brake actuator.

To ensure that the snap ring 82 is properly seated, a feeler gauge (not shown) may be used to check the width of the gap 88 in the snap ring 82. The feeler gauge has a blade thin enough to fit between the inward face 90 and the outward face 94 and sized to fit, within a predetermined tolerance, into the gap 88 of a properly positioned snap ring 82. If the feeler gauge can be inserted into the gap 88, then the snap ring 82 is properly positioned. If the snap ring 82 hangs up at any point, the gap 88 will be less than design value, and the feeler gauge will not fit into the gap 88.

Figure 4:
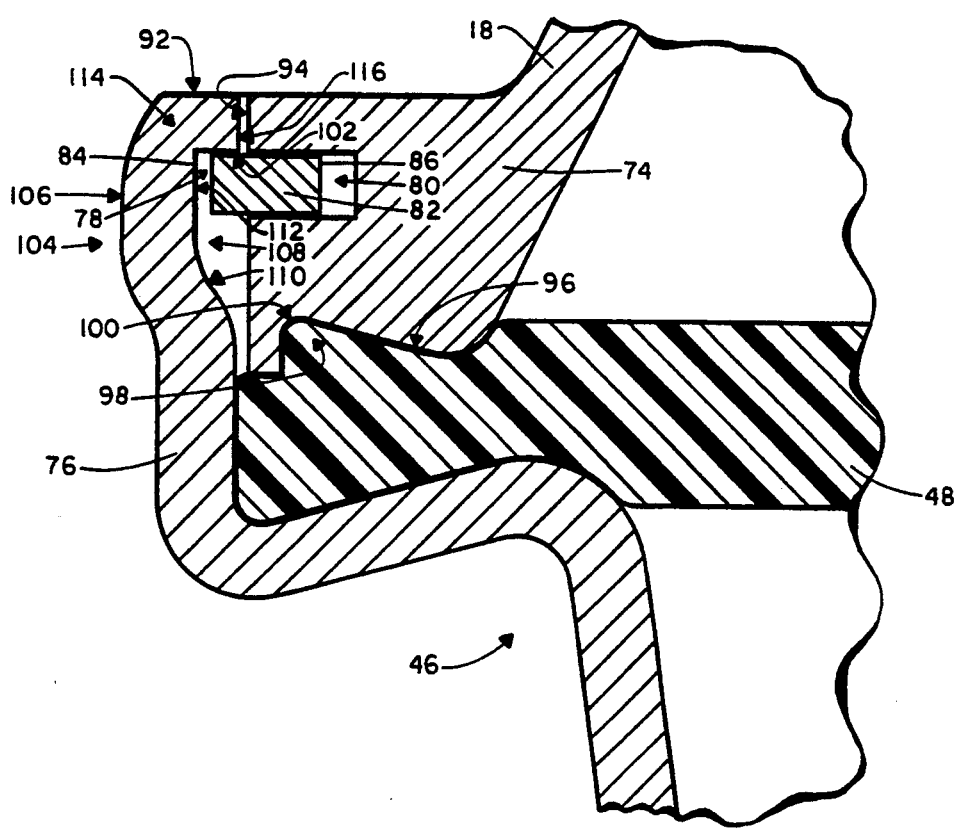
FIG. 4 is an enlarged sectional view of a portion of the actuator enclosed by circle A in FIG. 1, and showing a second embodiment of a tamper-resistant clamp shown in FIGS. 1 and 2.

A second embodiment of the invention is illustrated in FIG. 4. In this embodiment, the adapter 18 and spring diaphragm 48 are the same as in the first embodiment. However, the groove 78 in the head 46 is at least partially defined by a lip 102. The lip 102 is formed by first rolling, or otherwise deforming, a portion of the rim 76 radially outwardly to form an annular expansion 104 about the rim 76 near the terminal edge 92 thereof. The annular expansion 104 has an outer face 106 and an inner face 108. The outer face 106 is arcuate in cross section. The inner face 108 comprises an arcuate section 110 and an annular axial face 112.

An annular retaining flange 114 is then formed at the terminal annular edge 92 to extend radially inwardly. The annular inner surface 116 of the retaining flange 114, defines an inward face adapted to be in confronting relationship to the outward face 94 on the adapter flange 74, and the inner radial surface of the retaining flange 114 defines the lip 102. The clearance between the annular inner surface 116 and the outward face 94 is preferably in the range of 0.010 inches to 0.015 inches.

The groove 78 in the head 46 is thus defined by the lip 102, and the annular inner surface 116 and the arcuate section 110 of the inner face 108 of the annular expansion 104. When assembled, the groove 78 aligns with the groove 80 in the adapter flange 74. As in the first embodiment, the snap ring 82 positioned in the head groove 78 and the adapter groove 80, keeps the head 46 securely attached to the adapter 18.

The second embodiment assembles in the same manner as the first embodiment. A funnel (not shown) is placed with its throat end against the annular rim 76 on the head 46. The snap ring 82 is inserted into the groove 80 in the adapter flange 74. The adapter flange 74 is then inserted into the large end of the funnel. By moving the adapter 18 inwardly of the funnel, the snap ring 82 is squeezed into the adapter groove 80 as described above so that its outer radial portion 84 is completely received within the groove 80.

The adapter is then moved inwardly of the annular rim 76 on the head 46 until the adapter groove 80 clears the lip 102 and the snap ring 82 is released. When the snap ring 82 is released, it returns to its former shape, thus engaging the lip 102 on the annular rim 76. The snap ring 82 is also engaged in the adapter groove 80, thus locking the head 46 to the adapter 18. A feeler gauge as described above can be used to ensure proper placement of the snap ring 82. Once installed, the snap ring 82 is not accessible, and can not be removed without deforming, or otherwise materially altering the head 46 or the adapter 18.

Figure 5:
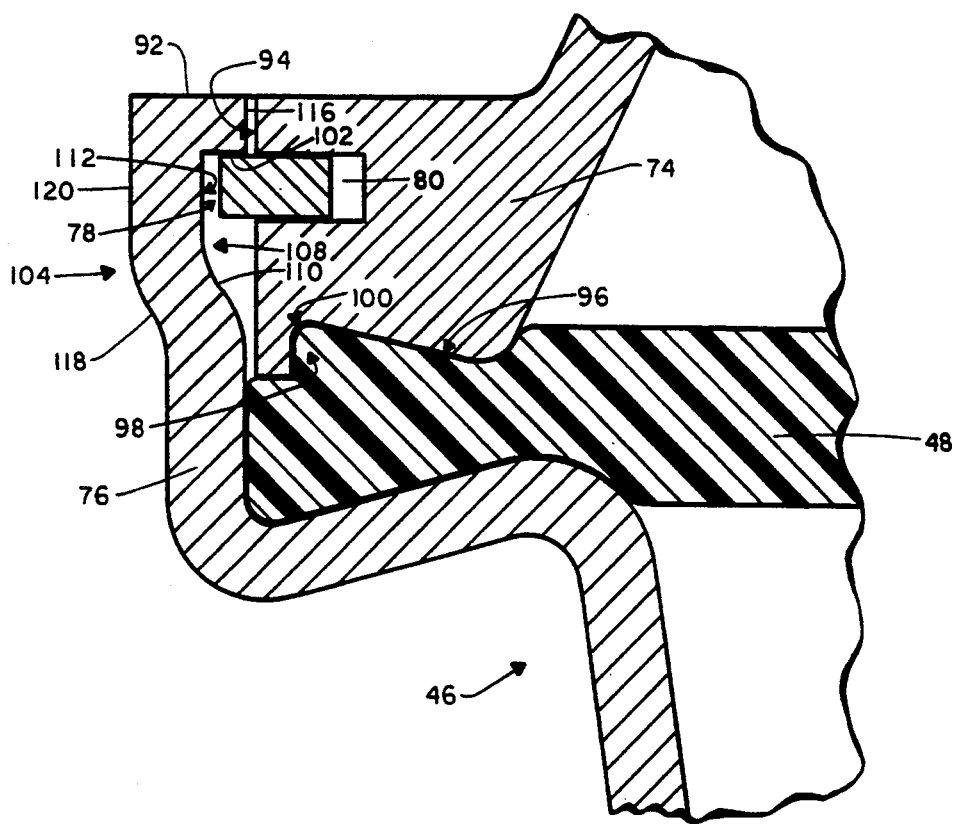
FIG. 5 is an enlarged sectional view of a portion of the actuator enclosed by circle A in FIG. 1, and showing a third embodiment of a tamper-resistant clamp shown in FIGS. 1 and 2.

A third embodiment of the invention is illustrated in FIG. 5. It is similar in all respects to the second embodiment, except that the outer face 106 of the annular expansion 104 has a similar cross section to the inner face 108, to define an outer arcuate section 118 and an outer annular axial face 120. This embodiment is assembled similarly to the second embodiment.

Figure 6:
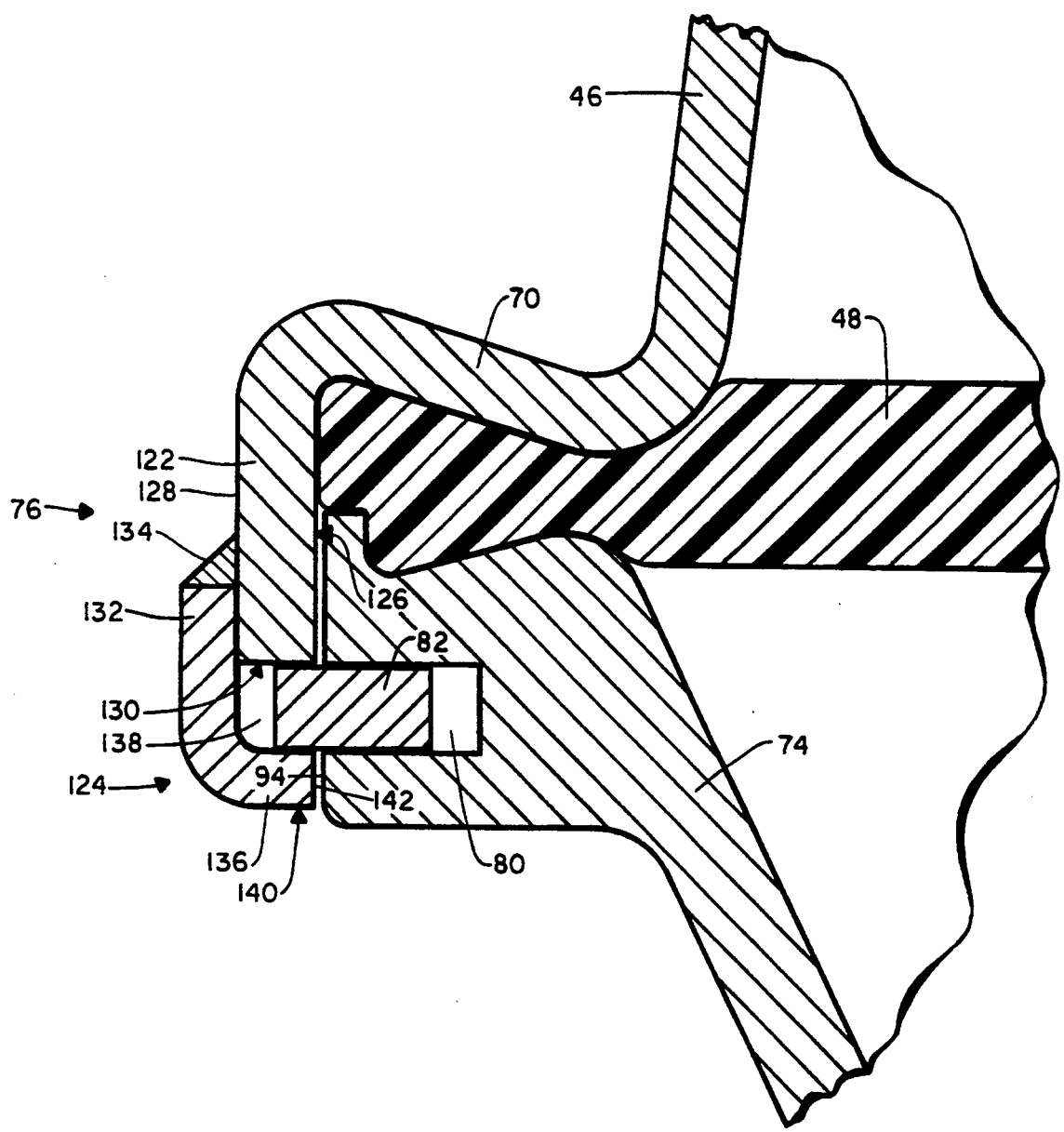
FIG. 6 is an enlarged sectional view of a portion of the actuator enclosed by circle A in FIG. 1, and showing a fourth embodiment of a tamper-resistant clamp shown in FIGS. 1 and 2.

A fourth embodiment of the invention is illustrated in FIG. 6. It is likewise similar to the first embodiment, except for the manner of forming an annular groove 138 in the head 46. The head rim 76 comprises two parts: an annular extension 122 extending axially from the shoulder 70 and a hoop 124 which has an L-shaped cross section. The annular extension 122 has an inner face 126, an outer face 128 and a terminal end 130. The hoop 124 comprises an annular band 132, which fits over the outer face 128 of the annular extension 122 and is welded thereto by a fillet or other suitable weld 134. An inwardly directed annular flange 136 on the annular band 132 partially defines the groove 138 for receiving the snap ring 82. The groove 138 is formed of the space between the terminal end 130 of the annular extension 122, the inwardly directed flange 136, and the annular band 132.

As in the previous embodiments, the structure of attaching mechanism 50 inhibits disassembly of the spring chamber 16. The outer surface of the inwardly directed flange 136 defines a terminal annular edge 140 on the annular rim 76. The radially directed end of the flange 136 defines an inward face 142 which stands in confronting relationship to the outward face 94. The clearance between the inward face 142 and the outward face 94 is preferably in the range of 0.010 inches to 0.015 inches. When assembled, the groove 138 aligns with the groove 80 in the adapter flange 74. The snap ring 82, positioned in the head groove 138 and the adapter groove 80, keeps the head 46 securely attached to the adapter 18. The close tolerance between the inward face 142 and the outward face 94 prevents removal of the snap ring 82 and disassembly of the spring chamber 16 without deforming, or otherwise materially altering the head 46 or the adapter 18 or both.

The fourth embodiment assembles in the same manner as the first embodiment. A funnel (not shown) is placed with its throat end against the annular rim 76 on the head 46. The snap ring 82 is inserted into the groove 80 in the adapter flange 74. The adapter flange 74 is then inserted into the large end of the funnel. By moving the adapter 18 inwardly of the funnel, the snap ring 82 is squeezed into the adapter groove 80 as described above so that its outer radial portion 84 is completely received within the groove 80.

The adapter is then moved inwardly of the annular rim 76 on the head 46 until the adapter groove 80 clears the inwardly directed flange 136 and the snap ring 82 is released. When the snap ring 82 is released, it returns to its former shape, thus engaging the groove 138 on the annular rim 76. The snap ring 82 is also engaged in the adapter groove 80, thus locking the head 46 to the adapter 18. A feeler gauge as described above can be used to ensure proper placement of the snap ring 82.

Figure 7:
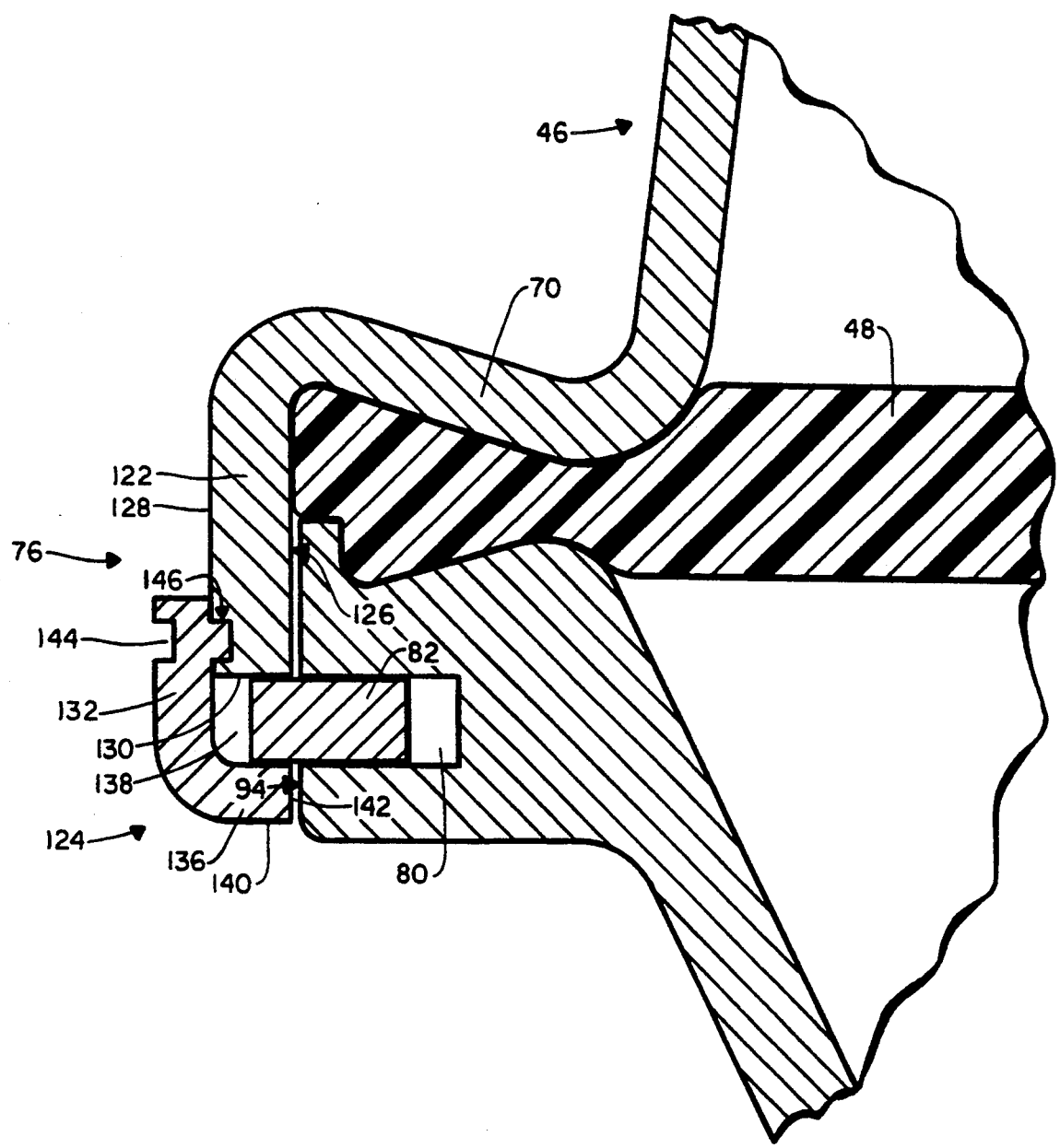
FIG. 7 is an enlarged sectional view of a portion of the actuator enclosed by circle A in FIG. 1, and showing a fifth embodiment of a tamper-resistant clamp shown in FIGS. 1 and 2.

The fifth embodiment is illustrated in FIG. 7. It is essentially the same as the fourth embodiment, except that the hoop 124 is not welded to the annular flange 122. Instead, the hoop 124 is punched onto the outer face 128 of the annular flange 122 by a plurality of punches 144 about the circumference of the hoop 124. Each punch is formed by pressing a small portion of the hoop 124 inwardly so that the material of the hoop 124 is pressed into and forms an indentation 146 on the annular flange 122.

Reasonable variation and modification are possible within the scope of the foregoing disclosure and drawings without departing from the spirit of the invention, as defined in the accompanying claims.

The embodiments of the invention in which an exclusive property or privilege is claimed are as follows:

1. In a fluid-operated brake actuator of the type having a generally cylindrical head with a first annular flange, said first annular flange having a radially outwardly protruding shoulder and an annular rim extending axially from the shoulder, said rim having an inward face and a terminal annular edge, said actuator further having a flange case with a second annular flange, said second annular flange having an axially disposed outward face in confronting relationship to the inward face, said head and flange case thereby defining a chamber, and a power spring compressed within the chamber, the force of said power spring tending to separate the head from the flange case, the improvement comprising:

a first annular groove in the inward face, said first annular groove being disposed axially from the terminal annular edge, an opposing second annular groove in the outward face, a portion of the outward face being in confronting relationship to the inward face between the first annular groove and the terminal annular edge, and a ring having a radial outward portion disposed in the first annular groove and a radial inward portion disposed in the second annular groove, whereby the head is securely fixed to the flange case and the ring is substantially inaccessible from the exterior of the brake actuator thereby deterring manual separation of the head from the flange case.

2. A fluid-operated brake actuator according to claim 1 wherein the second annular flange has a generally radially disposed face and the actuator further comprises a flexible diaphragm having a circumferential edge portion compressed between the radially outwardly protruding shoulder and the radially disposed face.

3. A fluid-operated brake actuator according to claim 2 wherein the radially disposed face has an annular dished portion, the diaphragm has an annular bead, and the bead is received in the dished portion.

4. A fluid-operated brake actuator according to claim 3 wherein the depth of the second annular groove is sufficient to completely receive the ring.

5. A fluid-operated brake actuator according to claim 3 wherein the ring is split and extends circumferentially less than 360°.

6. A fluid-operated brake actuator according to claim 5 wherein the power spring is disposed between the diaphragm and the head.

7. A fluid-operated brake actuator according to claim 2 wherein the power spring is disposed between the diaphragm and the head.

8. A fluid-operated brake actuator according to claim 1 wherein the depth of the second annular groove is sufficient to completely receive the ring.

9. A fluid-operated brake actuator according to claim 4 wherein the ring is split and extends circumferentially less than 360°.

10. A fluid-operated brake actuator according to claim 1 wherein the ring is split and extends circumferentially less than 360°.

11. A fluid-operated brake actuator according to claim 1 wherein the ring is flat to define a generally rectangular cross section.

12. A fluid-operated brake actuator according to claim 4 wherein the ring is flat to define a generally rectangular cross section.

13. A fluid-operated brake actuator according to claim 5 wherein the ring is flat to define a generally rectangular cross section.

14. A fluid-operated brake actuator according to claim 1 wherein a portion of the annular rim extends radially outwardly, and a retaining flange extends radially inwardly at the terminal annular edge thereby forming a lip, said radially outwardly extending portion and said lip at least partially defining the first annular groove.

15. A fluid-operated brake actuator according to claim 14 wherein the portion of the annular rim extending radially outwardly has an outer surface which is arcuate in cross section.

16. A fluid-operated brake actuator according to claim 1 wherein the annular rim comprises a hoop encircling an annular extension extending axially from the shoulder, the hoop having a radially inwardly directed flange at least partially defining the first annular groove.

17. A fluid-operated brake actuator according to claim 16 wherein the hoop is welded to the annular extension.

18. A fluid-operated brake actuator according to claim 17 wherein the annular extension further comprises a terminal end, and the hoop is L-shaped in cross section comprising an annular band and the radially inwardly directed flange, the groove being defined by the space between the terminal end, the annular band and the radially inwardly directed flange.

19. A fluid-operated brake actuator according to claim 16 wherein the hoop attaches to the annular extension by a plurality of punches about the hoop, each punch comprising a portion of the material of the hoop extending radially inwardly into a mating indentation on the annular extension.

20. A fluid-operated brake actuator according to claim 19 wherein the punches are formed by pressing inwardly radially against a portion of the hoop material to push the hoop material into and form an indentation in the material of the annular extension.

* * * * *